UNITED STATES PATENT OFFICE.

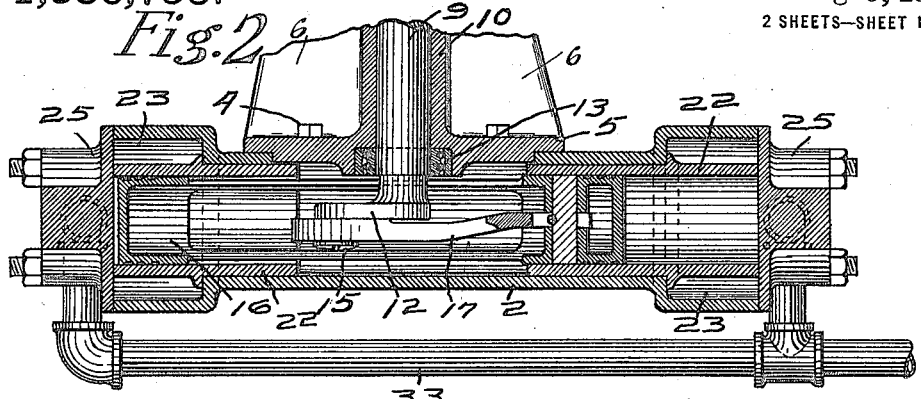
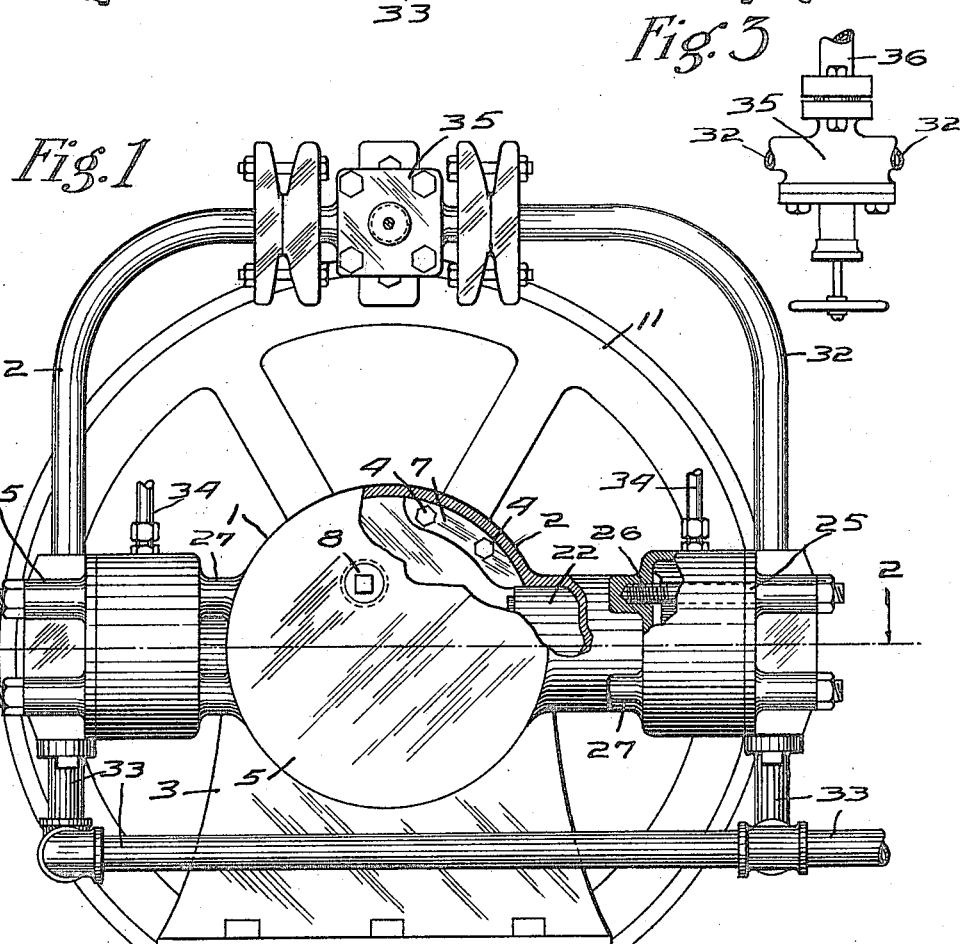

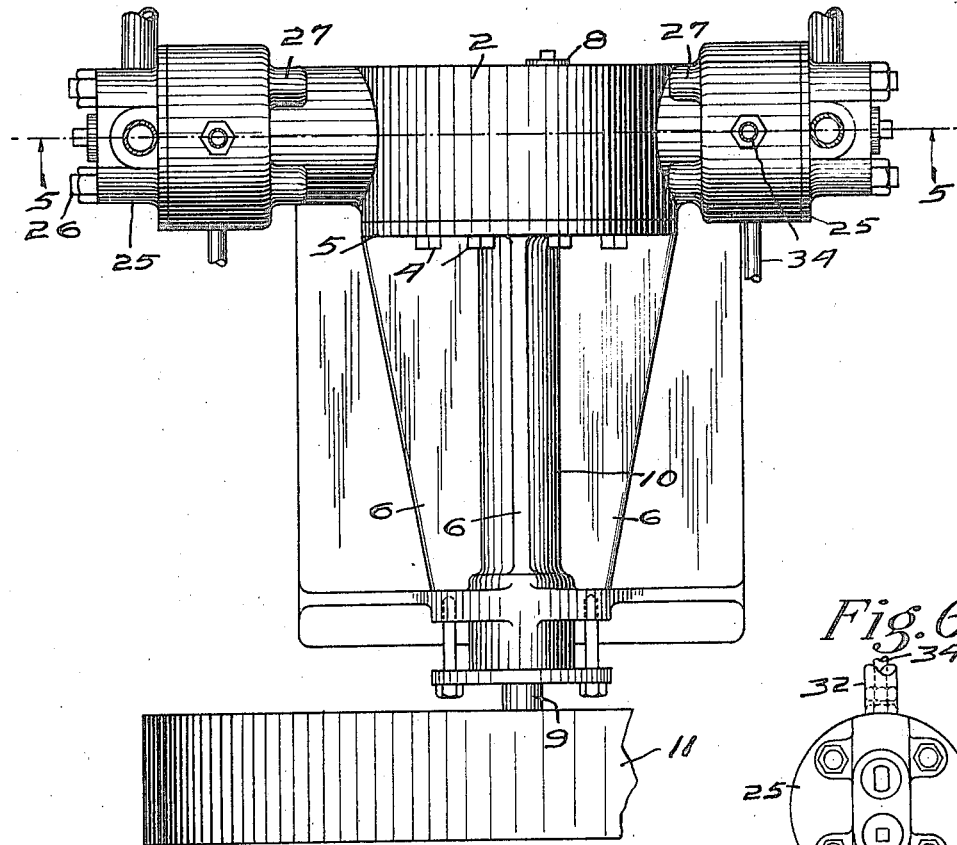
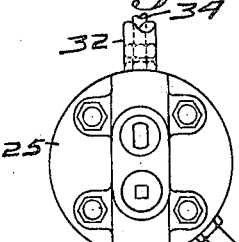
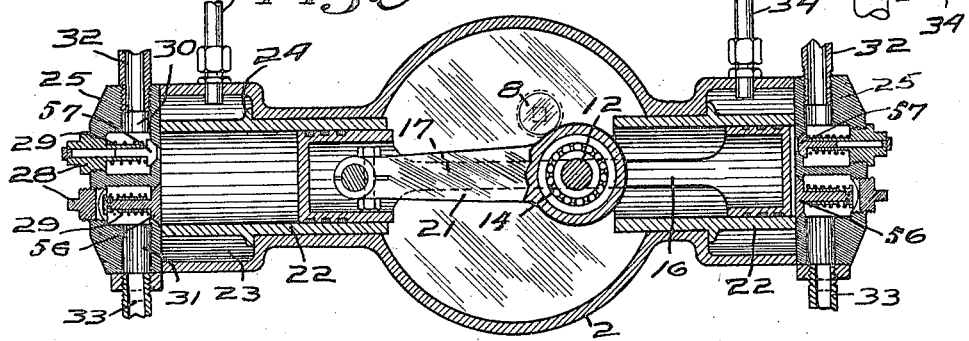
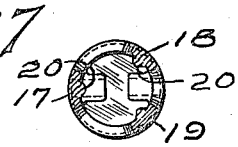

WALTER CHARLES BAER, OF TOLEDO, OHIO.

REFRIGERATION APPARATUS.

1,386,753. Specification of Letters Patent. Patented Aug. 9, 1921.

Application filed December 11, 1919. Serial No. 344,036.

*To all whom it may concern:*

Be it known that I, WALTER CHARLES BAER, a citizen of the United States, and a resident of Toledo, in the county of Lucas and State of Ohio, have invented a certain new and useful Refrigeration Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient refrigerating mechanism to be used in connection with refrigerating apparatus of the well known type wherein is located the usual compressor, condenser, receiver, expansion valve and the refrigerating or expansion coils through which the heat is transmitted from a room or from brine or other medium. My invention particularly has for its object to provide in such an apparatus an efficient condenser apparatus comprising compressor and combination of condenser and receiver. These coact together to condense the ammonia preparatory to the refrigerating step in the process.

The condensing apparatus or part of the apparatus involved in my invention includes a pump which draws the ammonia from the expansion coils and directs it to the condenser, whence the ammonia passes to the expansion coils. The invention also has for its object to provide in a condensing apparatus a combination of coils and a receiver which will efficiently cool the gas under pressure and thereby condense all or a greater part of the gas to a liquid.

Other features and advantages of my invention will appear from the following description and upon examination of the drawings.

The invention may be contained in structures used in refrigerating apparatus of different forms. To illustrate a practical application of my invention I have selected part of a refrigerating apparatus containing the invention and shall describe it hereinafter. The part selected is illustrated in the accompanying drawings together with its connection with other parts of refrigerating apparatus commonly used in the art.

Figure 1 of the drawing illustrates an end view of the compressor. Fig. 2 illustrates a sectional view taken on the line 2—2 indicated in Fig. 1. Fig. 3 illustrates a valve for controlling the passageway between the compressor and the condenser. Fig. 4 is a top view of the compressor. Fig. 5 is a sectional view taken on the line 5—5 indicated in Fig. 4. Fig. 6 is an end view of one of the cylinders of the compressor. Fig. 7 is a sectional view of the double headed piston.

1, in the figures, is the compressor that is supported on the base 3. The shell 2 is bolted to the support by means of the bolts 4 that pass through the plate 5 having the bracing flanges 6 connected to the base 3. The bolts 4 extend through the plate 5 and flanges 7 located within the shell 2, and when the bolts are drawn, tightly clamp the plate 5 and the shell 2 together. This provides a ready means for removing the shell together with all of its operating mechanism of the compressor contained within the shell.

The shell has cooling chambers and also contains the cylinders, a double headed piston and the crank arm and piston rod for operating the double headed piston. It also contains the oil for oiling the crank, the piston rod and the pistons. In disconnecting the shell together with the operative parts, the disconnection between the piston rod and the pistons is made through an opening which is closed by the threaded cap 8 and upon loosening the bolts 4, the shell and its parts may be entirely removed from the supporting frame or base and thus may be easily placed upon a bench for repair or alterations. The threaded cap also provides a means for supplying oil to the shell which is dashed by the movement of the piston rod to the movable parts within the shell.

The compressor is provided with a shaft 9 that extends through a cylindrical bearing part 10 formed between the flanges 6, the shaft 9 is connected to a fly wheel 11 and to a crank 12. Ball bearings 13 may be used for supporting the shaft 9 within the sleeve 10.

The crank 12 is provided with roller or ball bearings 14 located between the connecting rod and the crank pin. The connecting rod is secured to the crank pin by means of a large headed screw 15. The screw 15 may be threaded into the crank pin by means of a screw driver inserted through the opening closed by the threaded cap 8, the opening being placed in line with the circle of movement with the crank pin and preferably on the upper side of the circle. The double headed piston 16 is provided with three ribs 17, 18 and 19 having reinforcing ridges 20. The rib 17 is located on one side of the connecting rod 21 and the ribs 18 and 19 are located on the opposite side of the connecting rod and are smaller than the rib 17. The ribs 18 and 19 are placed closer together than they are to the rib 17 so as to allow movement of the crank 12 and the piston rod 21, between the ribs 17 on one side and 18 and 19 on the other. The piston rod 21 is preferably connected to one of the pistons of the double piston heads 16. The strain between the piston heads is transmitted on one side through the larger rib 17 and on the other side it is divided between the ribs 18 and 19.

The piston heads are located in removable cylinders 22 that fit the ends of the shell 2. The outer ends of the shell 2 are enlarged to form the water chambers 23 between the wall of the shell 2 and the cylinders 22. The cylinders 22 are provided with flanges 24 that set up against the outwardly extending portion of the wall of the chambers 23 to form a shoulder against which the cylinders are pressed when inserted in position. The ends of the shell 2 and the cylinders 22 are closed by the cylinder heads or cap plates 25 that contain the valves and the communicating chambers between the cylinders and other parts of the apparatus. The cylinder heads 25 are secured in position by bolts 26 that pass through bosses formed on the heads and through bosses 27 that form enlarged portions of the shell 2. They pass through the water chambers 23. By this arrangement the heads may be readily secured in position and may be readily removed for withdrawing the cylinders and also the piston when the screw 15 is removed from the crank pin. The heads may thus be readily removed and placed on the bench for repair or replacement of parts and again secured to the shell in the assembling of the compressor.

The heads 25 are provided with the inlet and outlet valves 56 and 57 which are supported in bushings 28. They are provided with compression springs 29 surrounding their stems which operate to automatically seat the valves during the operation of the condenser. The valves may be readily removed by unscrewing the bushings from the cylinder heads.

It will thus be seen that I have constructed a compressor that may be readily assembled and disassembled for repair or for replacement of parts.

The head is provided with the chambers 30 and 31 that communicate with the interior of the cylinders 22 when the valves are opened and pipes 32 and 33 which are connected with the condenser and with the expansion coils of the apparatus. Chambers 23 are connected by means of pipes 34 with a source of water supply which may be in the form of a radiator for keeping the cylinders 22 cool.

The pipes 32 are connected together through a valve 35 and to the pipe 36 which passes to the oil separator 37. The valve 35 operates to close the pipe 36. The oil separator 37 is of any form well known in the art having a baffle plate 38 which the gas strikes when entering the oil separator. The oil collects or congeals upon the baffle plate 38 and drops to the bottom of the separator 37 whence it may be drawn by the cock 39. The oil separator 37 is located in the connection 36 between the compressor and the condenser 40.

The condenser 40 is provided with a plurality of coils 41 which are located concentric with each other. The coils 41 are located in the shell 42. The coils 41 are connected to the end of the pipe 36, which thus forms a manifold. They are preferably welded to the pipe 36 and thus form an integral member with the pipe 36. They extend to the bottom of the shell and connect at that point with the bottom of the receiver 43. The receiver 43 is located within the lower ends of the coils 41 and also concentric with the coils 41. The receiver 43 thus forms a long cylinder of a small diameter extending upward within the coils. It thus forms a part of the condenser and the gases are cooled by the water that flows over the coils and on to the receiver. This provides an exceedingly compact arrangement of the condenser and the receiver.

The pipe 44 extends through the coils 41 and into and to near the bottom of the receiver 43. Liquefied ammonia under the pressure which it is subjected to, rises through the pipe 44 and passes through the expansion valve 45 to the expansion coils. An indicator 46 may be connected to the pipe 44 to indicate the pressure to which the liquid and gaseous ammonia is subjected to and with which it passes to the expansion valve 45. The expansion valve 45 may be regulated so as to secure the desired pressure within the condensing apparatus, that is, within the compressor, the condenser and the receiver as they are individually termed in the art, but which coact to reduce the gas to liquid which is subsequently expanded in the expansion coil whereby heat is extracted from the air or liquid surrounding the expansion coils.

Water is allowed to flow over the coils 41, the pipe 44 and the receiving chamber 43. The overflow is collected in the trough 46 located at the lower end of the shell 42. It may pass over through the nozzle 47 into a suitable vat or outlet. The level of the water in the shell 42 may be controlled by the outlet 48.

I claim:

1. In a compressing apparatus, a shell having enlarged portions, a crank and connecting rod located in one of said enlarged portions, a double headed piston located in the shell and connected to the connecting rod, ribs connected to the heads of the piston located on opposite sides of the connecting rod and the crank, removable cylinders located in two of the said enlarged portions and forming, between the cylinders and the shell, water chambers, removable cylinder heads secured to the shell, a closing plate for closing the part of the shell containing the crank and the connecting rod, and a base for supporting the closing plate whereby the shell and the parts contained therein are supported.

2. In a compressing apparatus, a shell having cylinders, a double headed piston rod located in the shell, the heads of the pistons located in the cylinders, a crank shaft and crank, a connecting rod connected to the piston and the crank, the heads of the piston connected together by three ribs, two of the ribs located on opposite sides of the crank shaft, and the remaining rib located opposite the end of the crank shaft, the crank and the connecting rod movable between two of the ribs and the third rib, the shaft extending between the first two named ribs.

In testimony whereof I have hereunto signed my name to this specification.

WALTER CHARLES BAER.